(12) United States Patent
Tomita

(10) Patent No.: US 7,442,663 B2
(45) Date of Patent: Oct. 28, 2008

(54) CERAMIC CLAY, CERAMIC FORMED ARTICLE, CERAMIC STRUCTURE, AND MANUFACTURING METHODS THEREOF

(75) Inventor: Takahiro Tomita, Chita (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/199,145

(22) Filed: Aug. 9, 2005

(65) Prior Publication Data

US 2006/0035778 A1      Feb. 16, 2006

Related U.S. Application Data

(63) Continuation-in-part of application No. 10/991,097, filed on Nov. 18, 2004, now abandoned.

(30) Foreign Application Priority Data

Mar. 31, 2004   (JP) .............. 2004-107450

(51) Int. Cl.
  C04B 35/00   (2006.01)
  C04B 35/03   (2006.01)
  C04B 35/04   (2006.01)
  C04B 35/44   (2006.01)
  C04B 33/00   (2006.01)
  C04B 33/24   (2006.01)

(52) U.S. Cl. .............. 501/141; 501/142; 501/143; 501/144; 501/108; 501/118; 501/119; 501/121

(58) Field of Classification Search ......... 501/141–144, 501/108, 118, 119, 121
See application file for complete search history.

(56) References Cited

U.S. PATENT DOCUMENTS

| 4,656,156 | A | * | 4/1987 | Misra ............... 502/415 |
| 5,346,722 | A | * | 9/1994 | Beauseigneur et al. ...... 427/300 |
| 5,507,980 | A |   | 4/1996 | Kelkar et al. ............. 264/15 |
| 6,346,564 | B1 |  | 2/2002 | Kubota et al. ............ 524/403 |
| 6,593,265 | B2 | * | 7/2003 | Stamires et al. ........... 502/73 |
| 6,815,389 | B2 | * | 11/2004 | Stamires et al. ......... 502/80 |

FOREIGN PATENT DOCUMENTS

JP        3 227 039        8/2001

OTHER PUBLICATIONS

Clay Handbook, Version 2, Gihodo Shuppan Co., 1987, pp. 828-830.
Article Clay, 10th Anniversary Journal of Artificial Clay Research Institute, pp. 175-178.
Miller, M. et al, "The Use of Montmorillonites as Extrusion Aids for Alumina," Ceram. Eng. Sci. Proc., 12[1-2], 1991, pp. 33-48.

* cited by examiner

*Primary Examiner*—Michael A Marcheschi
(74) *Attorney, Agent, or Firm*—Burr & Brown

(57) ABSTRACT

There is disclosed a ceramic clay obtained by kneading a forming material containing a ceramic forming material, wherein the forming material contains layered double hydroxide, in addition to the ceramic forming material, at a ratio of 0.5 to 50% by mass with respect to a total with the ceramic forming material, and hardness measured by an NGK clay hardness meter is set to 4 to 18 mm. A high-strength honeycomb structure can be obtained capable of preventing or inhibiting pollution and global warming when used in manufacturing a ceramic structure, and having few defects such as cracks.

20 Claims, No Drawings

CERAMIC CLAY, CERAMIC FORMED ARTICLE, CERAMIC STRUCTURE, AND MANUFACTURING METHODS THEREOF

CROSS-REFERENCE TO RELATED APPLICATION

This application is a continuation-in-part of U.S. patent application Ser. No. 10/991,097 filed on Nov. 18, 2004 now abandoned.

BACKGROUND OF THE INVENTION AND RELATED ART

The present invention relates to a ceramic clay, a ceramic formed article, a ceramic structure, and methods of manufacturing them. In more detail, the present invention relates to a ceramic clay, a ceramic formed article, a ceramic structure, and methods of manufacturing them, capable of preventing or reducing generation of $CO_2$ or harmful gas during firing to thereby prevent or inhibit pollution, and global warming, when used in manufacturing a ceramic structure, and capable of obtaining a high-strength honeycomb structure having few defects such as cracks.

To form a ceramic product, in general, methods such as spinning lathe forming, extrusion forming, injection forming, press forming, and sheet forming have been used. However, since plasticity/shape retaining property and the like required for the forming cannot be obtained only by a ceramic material powder. Therefore, after adding water, organic binder and the like to thereby form a ceramic forming material, the material is formed. For example, a method of manufacturing a ceramic structure has been disclosed in which in the extrusion forming, a ceramic material, water, organic binder and the like are kneaded, and the forming material (clay) whose plasticity has been enhanced is extruded, dried, and fired (see, e.g., Japanese Patent No. 3227039).

When an added amount of the organic binder imparting the plasticity or the shape retaining property increases, the forming property of ceramic is enhanced. For example, in the extrusion forming, to form a large-sized structure or a structure having a complicated cell structure which has been increasingly demanded in recent years, kneaded clay having a satisfactory forming property is required as compared with a case where a small-sized or simple ceramic structure is manufactured. As a result, a large amount of organic binder has to be added.

However, when the added amount of the organic binder is large, the organic binder burns down during firing. Therefore, there has been a problem that a space occupied by the organic binder becomes a defect at a forming time, and mechanical strength of the structure drops. In a large-sized structure, there has been a problem that the inside of the structure is at high temperature by burning heat when burning the organic binder during the firing, defects such as cracks are generated because of thermal stress by an inner/outer temperature difference of the structure, the mechanical strength of the structure is lowered, and yield is largely lowered. Furthermore, $CO_2$ or harmful gas is generated, and released to the atmosphere by the burning of the organic binder during the firing, and this has raised a problem in environmental respects such as pollution and global warming.

On the other hand, clay (Gairome clay, etc.) which is a pottery material has such plasticity that forming is possible, even when the above-described organic binder is not contained. As a factor for this material to develop the plasticity, particles are fine, shape is flat or needlelike, and hydrogen bond is caused with respect to water (See pp. 828 to 830 of Clay Handbook Version 2 (GIHODO SHUPPAN Co. 1987)). Attempts have been made to add a compound having such characteristic to a ceramic material powder as in a conventional organic binder, and accordingly impart plasticity to the ceramic material clay (see pages 175 to 178 of Artificial Clay (10th Anniversary Journal of Artificial Clay Research Institute), and The Use of Montmorillonites as Extrusion Aids for Alumina, Ceram. Engi. Sci. Proc. 12 [1-2] pp. 33 to 48 (1991)).

However, with regard to clay minerals disclosed in the above-described documents and having plasticity, such as bentonite and smectite, naturally produced minerals contain a large amount of impurities, and it is feared that the products run out in near future, and there has been a problem that synthetic compounds or refined natural products are expensive as compared with the organic binders.

The present invention has been developed in view of the above-described problems, and an object thereof is to provide a ceramic clay, a ceramic formed article, a high-strength ceramic structure, and methods of efficiently manufacturing them, capable of preventing or reducing generation of $CO_2$ or harmful gas during firing to thereby prevent or inhibit pollution and global warming, when used in manufacturing a ceramic structure, and capable of obtaining a high-strength ceramic structure having few defects such as cracks.

SUMMARY OF THE INVENTION

To achieve the above-described object, according to the present invention, there are provided the following ceramic clay, ceramic formed article, high-strength ceramic structure, and methods of efficiently manufacturing them.

[1] A ceramic clay obtained by kneading a forming material containing a ceramic forming material, wherein the forming material contains layered double hydroxide shown by the following formula (I), in addition to the ceramic forming material, at a ratio of 0.5 to 50% by mass with respect to a total with the ceramic forming material, and hardness measured by an NGK clay hardness meter is in a range of 4 to 18 mm.

$$[M^{2+}_{1-x}M^{3+}_x(OH)_2][A^{n-}_{x/n} \cdot yH_2O] \tag{I}$$

(where $M^{2+}$, $M^{3+}$, and $A^{n-}$ denote a bivalent cation, tervalent cation, and an anion, respectively; n denotes anion valence ($1 \leq n \leq 3$), x denotes a composition ratio of tervalent cation ($M^{3+}$) with respect to the sum of bivalent cation ($M^{2+}$) and tervalent cation ($M^{3+}$) and a value in a range of $0.1 \leq x \leq 0.4$, y denotes a molar number of water in the layered double hydroxide and an arbitrary value corresponding to the combination with cation or anion, or the value of x.)

[2] The ceramic clay according to the above [1], wherein the layered double hydroxide is hydrotalcite represented by the following formula (II):

$$Mg_{1-z}Al_z(OH)_2(CO_3)_{z/2} \cdot mH_2O \tag{II},$$

(where z denotes a composition ratio of Al with respect to the sum of Mg and Al and a value in a range of $0.1 \leq z \leq 0.4$, and m denotes a molar number of water in hydrotalcite and an arbitrary value corresponding to the value of z).

[3] The ceramic clay according to the above [1], wherein the layered double hydroxide is hydrotalcite represented by the following formula (III):

(III).  $Mg_6Al_2(OH)_{16}CO_3 \cdot 4H_2O$

[4] A ceramic formed article obtained by forming the ceramic clay according to any one of the above [1] to [3].

[5] The ceramic formed article according to the above [4], comprising: a honeycomb formed article formed into a honeycomb shape.

[6] A ceramic structure obtained by firing the ceramic formed article according to the above [4] or [5].

[7] A method of manufacturing a ceramic clay, in which a forming material containing a ceramic forming material is kneaded to obtain the ceramic clay, comprising the steps of: using the forming material containing layered double hydroxide shown by the following formula (I), in addition to the ceramic forming material, at a ratio of 0.5 to 50% by mass with respect to a total with the ceramic forming material.

$$[M^{2+}_{1-x}M^{3+}_{x}(OH)_2][A^{n-}_{x/n} \cdot yH_2O] \quad (I)$$

(where $M^{2+}$, $M^{3+}$, and $A^{n-}$ denote a bivalent cation, tervalent cation, and an anion, respectively; n denotes anion valence ($1 \leq n \leq 3$), x denotes a composition ratio of tervalent cation ($M^{3+}$) with respect to the sum of bivalent cation ($M^{2+}$) and tervalent cation ($M^{3+}$) and a value in a range of $0.1 \leq x \leq 0.4$, y denotes a molar number of water in the layered double hydroxide and an arbitrary value corresponding to the combination with cation or anion, or the value of x.)

[8] The method of manufacturing the ceramic clay according to the above [7], further comprising the steps of: using hydrotalcite represented by the following formula (II) as the layered double hydroxide:

$$Mg_{1-z}Al_z(OH)_2(CO_3)_{z/2} \cdot mH_2O \quad (II),$$

(where z denotes a composition ratio of Al with respect to the sum of Mg and Al and a value in a range of $0.1 \leq z \leq 0.4$, and m denotes a molar number of water in hydrotalcite and an arbitrary value corresponding to the value of z).

[9] The method of manufacturing the ceramic clay according to the above [7] or [8], further comprising the steps of: using hydrotalcite represented by the following formula (III) as the layered double hydroxide:

$$Mg_6Al_2(OH)_{16}CO_3 \cdot 4H_2O \quad (III).$$

[10] The method of manufacturing the ceramic clay according to any one of the above [7] to [9], wherein hardness of the obtained ceramic clay, measured by an NGK clay hardness meter, is in a range of 4 to 18 mm.

[11] A method of manufacturing a ceramic formed article, comprising the steps of: further forming the ceramic clay obtained by the method according to any one of the above [7] to [10] to obtain the ceramic formed article.

[12] The method of manufacturing the ceramic formed article according to the above [11], further comprising the steps of: forming the ceramic clay into a honeycomb shape to obtain a honeycomb formed article.

[13] A method of manufacturing a ceramic structure, comprising the steps of: further firing the ceramic formed article obtained by the method according to the above [11] or [12] to obtain the ceramic structure.

According to the present invention, there are provided a ceramic clay, a ceramic formed article, a high-strength ceramic structure, and methods of efficiently manufacturing them, capable of preventing or reducing generation of $CO_2$ or harmful gas during firing to thereby prevent or inhibit pollution and global warming, when used in manufacturing a ceramic structure, and capable of obtaining a high-strength ceramic structure having few defects such as cracks.

DESCRIPTION OF THE PREFERRED EMBODIMENT

A best mode for carrying out the present invention will be described concretely hereinafter.

According to the present invention, there is provided a ceramic clay obtained by kneading a forming material containing a ceramic forming material, characterized in that the forming material contains layered double hydroxide, in addition to the ceramic forming material, at a ratio of 0.5 to 50% by mass with respect to a total with the ceramic forming material, and hardness measured by an NGK clay hardness meter is in a range of 4 to 18 mm.

In the present invention, the forming material further containing the layered double hydroxide in addition to the ceramic forming material is used. Examples of other components include an organic binder, water which is a dispersing medium, dispersant, pore former and the like.

In a case where the ceramic clay is used in manufacturing the ceramic structure, after the ceramic clay is formed into the ceramic formed article, and the ceramic formed article is fired, the ceramic forming material in the ceramic clay constitutes the ceramic structure. Examples of the ceramic forming material include an alumina forming material, mullite forming material, zirconia forming material, cordierite forming material, aluminum titanate forming material, silicon nitride forming material, silicon carbide forming material, aluminum nitride forming material and the like. The examples of these forming materials include oxide and the like containing the elements contained in the forming materials. The examples of the cordierite forming material include oxide, hydroxide, or carbonate containing at least one element selected from a group consisting of magnesium, aluminum, and silicon, such as talc, kaolin, alumina, aluminum hydroxide, silica, and magnesia. It is preferable that particle diameter of each of the components constituting the cordierite forming material is, for example, 0.5 to 50 μm in the case of talc, 0.1 to 20 μm in the case of kaolin, 0.1 to 20 μm in the case of alumina, 0.1 to 20 μm in the case of aluminum hydroxide, 1 to 100 μm in the case of silica, and 0.1 to 50 μm in the case of magnesia. There is no particular limitation to a ratio of each of the components as long as the main phase is a cordierite after firing. Examples of components constituting the silicon carbide forming material include a simple substance or a compound of at least one element selected from the group consisting of silicon and carbon such as silicon carbide, carbon, and silicon; and $Y_2O_3$, $Al_2O_3$, MgO, $SiO_2$, an alkaline earth metal oxide, or a rare earth oxide as a sintering aid. It is preferable that particle diameter of each of the components constituting the silicon carbide forming material is, for example, 0.5 to 50 μm in the case of silicon carbide, 0.1 to 20 μm in the case of silicon, 0.1 to 50 μm in the case of carbon, and 0.01 to 10 μm in the case of the sintering aid. There is no particular limitation to a ratio of each of the components as long as the main phase is silicon carbide after firing. Further, examples of components constituting the aluminum titanate forming material include a compound of at least one element selected from the group consisting of aluminum and titanium, such as alumina, aluminum hydroxide, and titanium oxide; and kaolin, silica, an alkaline earth metal oxide, or a rare earth oxide as a sintering aid. It is preferable that particle diameter of each of the components constituting the aluminum titanate forming material is, for example, 0.05 to 20 μm in the case of alumina, 0.01 to 10 μm in the case of titanium oxide, and 0.01 to 50 μm in the case of the sintering aid. There is no particular limitation to a ratio of each of the components as long as the main phase is aluminum titanate after firing.

A content ratio of the ceramic forming material is preferably 50 to 99.5% by mass with respect to a total of the ceramic forming material and layered double hydroxide. Even when the ratio is less than 50% by mass, there is not any problem, but a composition of the obtained ceramic structure is not obtained as desired, or a problem sometimes occurs in respect of cost. When the ratio exceeds 99.5% by mass, it is difficult to form the material.

The organic binder is used if necessary, in order to enhance plasticity and forming property of kneaded clay prepared by kneading the forming material. The binder is used if necessary, in order to perform a function of a shape retainer which holds the shape of the structure, when used in manufacturing the ceramic structure. On the other hand, the organic binder has problems that pollution or global warming by generation of $CO_2$ or harmful gas is promoted during the firing, a space occupied by the organic binder at the forming time results in defects, or defects such as cracks are generated in the honeycomb structure, and strength of the ceramic structure drops. Therefore, the content of the binder in the forming material needs to be minimized. Therefore, in the present invention, the content ratio of the organic binder is set to preferably 10 parts by mass or less, further preferably 5 parts by mass or less with respect to a total of 100 parts by mass of the ceramic forming material and the layered double hydroxide. The ratio may be 0 part by mass depending on applications (any binder may not be contained).

The examples of the organic binder include organic polymer. Concretely, the examples include hydroxypropoxyl methylcellulose, hydroxypropyl methylcellulose, methylcellulose, hydroxyethyl cellulose, carboxyl methylcellulose, polyvinyl alcohol and the like. The organic binder may be used alone or as a combination of two or more types.

In the present invention, even when the organic binder is used, as described above, the content ratio of the organic binder is preferably suppressed to 10 parts by mass or less with respect to a total of 100 parts by mass of the ceramic forming material and the layered double hydroxide. Accordingly, when the binder is used in manufacturing the ceramic structure, the binder is to solve the problem that the pollution or global warming by the generation of $CO_2$ or harmful gas is promoted during the firing, the space occupied by the organic binder at the forming time results in defects, or defects such as cracks are generated in the ceramic structure, and the strength of the ceramic structure drops. To compensate for the drop of the plasticity or forming property of the ceramic clay, the forming material is used having both a ceramic forming function and plasticity (forming property) imparting function, and further containing the layered double hydroxide.

In the present invention, the layered double hydroxide means representation by the following formula (I).

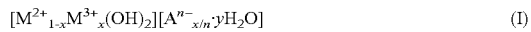

$$[M^{2+}_{1-x}M^{3+}_{x}(OH)_2][A^{n-}_{x/n} \cdot yH_2O] \quad (I)$$

In the above formula (I), $M^{2+}$, $M^{3+}$, $A^{n-}$ denote bivalent cation, tervalent cation, anion, respectively, n denotes anion valence ($1 \leq n \leq 3$), x denotes a composition ratio of tervalent cation ($M^{3+}$) with respect to the sum of bivalent cation ($M^{2+}$) and tervalent cation ($M^{3+}$) (composition ratio of bivalent cation is (1-x)) and shows a value in a range of generally $0.1 \leq x \leq 0.4$, preferably $0.2 \leq x \leq 0.33$ though it concretely depends on a combination of cation or anion, and y denotes a molar number of water in the layered double hydroxide and, concretely, an arbitrary value corresponding to the combination with cation or anion, or the value of x. In addition, a ratio of the bivalent cation to the tervalent cation ($M^{2+}/M^{3+}$) is preferably 1.5/1 to 9/1, more preferably 2/1 to 4/1. When the ratio ($M^{2+}/M^{3+}$) is within the range from 1.5/1 to 9/1, forming property can be improved.

The examples of the above-described bivalent cation include bivalent metal ions such as $Mg^{2+}$, $Ca^{2+}$, $Sr^{2+}$, $Zn^{2+}$, $Ni^{2+}$, $Co^{2+}$, $Fe^{2+}$, and $Mn^{2+}$, and one type alone, or a combination of two or more types may be used. The examples of the above-described tervalent cation include tervalent metal ions such as $Al^{3+}$, $Fe^{3+}$, $Cr^{3+}$, $Ti^{3+}$, $Y^{3+}$, $Ce^{3+}$, and $Mo^{3+}$, and one type alone, or a combination of two or more types may be used. The examples of the above-described anion include $CO_3^{2-}$, $Cl^{-}$, $NO^{3-}$, $CH_3COO^{-}$, and $PO_4^{3-}$, and $CO_3^{2-}$ is most preferable among them in view of improvement in forming property. One type alone, or a combination of two or more types may be used.

The layered double hydroxide for use in the present invention is contained at a ratio of preferably 0.5 to 50% by mass, further preferably 1 to 30% by mass with respect to a total with ceramic forming material. When the ratio is less than 0.5% by mass, sufficient forming property is not sometimes developed. Even when the ratio exceeds 50% by mass, there is not any problem, but a composition of the obtained ceramic structure is not easily obtained as desired. As to the ceramic clay containing the layered double hydroxide for use in the present invention, hardness measured by an NGK clay hardness meter (produced by NGK Insulators, LTD.) is in a range of 4 to 18 mm, preferably 6 to 17 mm. When the hardness is less than 4 mm, in the case that the clay is used in manufacturing the ceramic structure, the shape retaining property of the ceramic formed article drops. When the hardness exceeds 18 mm, the forming property drops.

The layered double hydroxide for use in the present invention is preferably in the form of particles. The particle diameter is preferably 30 μm or less, more preferably 10 μm or less, from the viewpoint of improvement in forming property. In addition, a residue on sieve (When extrusion is conducted to give a predetermined shape, for example, a honeycomb shape, a sieve having a sieve opening with one third the width of a slit width of the extrusion die for extrusion. A predetermined weight of raw material is passed through the sieve with letting water flow. The raw material remaining on the sieve to the last is collected and dried to weigh. The residue on sieve means the ratio of the weight of the dried remaining raw material to the predetermined weight.) is preferably 0.05% or less, more preferably 0.01% or less from the viewpoint of improvement in forming property. In addition, the total mount of impurities is preferably 2% or less from the viewpoint of improvement in forming property. "Impurity" here means a simple substance or a compound containing an element other than the elements constituting the layered double hydroxide in the present invention. Therefore, when the layered double hydroxide is, for example, hydrotalcite, a compound containing Mg or Al, which are elements constituting hydrotalcite, is not considered as an impurity. Compounds considered as impurities include, for example, $Fe_2O_3$, $TiO_2$, $CaO$, $K_2O$, and $Na_2O$. In addition, a specific surface area is preferably 0.5 to 200 m²/g, more preferably 1 to 150 m²/g, from the viewpoint of improvement in forming property. Further, apparent specific gravity is preferably 0.05 to 1 g/cm³, more preferably 0.1 to 0.4 g/cm³, from the viewpoint of improvement in forming property.

As the layered double hydroxide for use in the present invention, the layered double hydroxide having an appropriate composition is usable depending on the type of the ceramic forming material. For example, in a case where the cordierite forming material is used as the ceramic forming material, layered double hydroxide containing $Mg^{2+}$ which is bivalent cation, and $Al^{3+}$ which is tervalent cation can be used. When a silicon nitride forming material is used, magnesium oxide or yttrium oxide is used as a sintering aid. Therefore, layered double hydroxide containing $Mg^{2+}$ which is bivalent cation, and $Y^{3+}$ which is tervalent cation is usable. As to anion, appropriate anion can be selected in accordance with synthesis conditions of the layered double hydroxide or manufacturing conditions of ceramic. It is to be noted that with regard to the layered double hydroxide for use in the present invention, one type alone, or a combination of two or more types may be used.

As the layered double hydroxide for use in the present invention, hydrotalcite represented by the following formula (II) is preferable from viewpoints of price and impurity amount. Especially, a synthesized product of hydrotalcite is preferable because it is inexpensive as compared with smectite (synthesized product, refined product of mineral) or the like:

$$Mg_{1-z}Al_z(OH)_2(CO_3)_{z/2} \cdot mH_2O \qquad (II),$$

(where z denotes a composition ratio of Al with respect to the sum of Mg and Al (composition ratio of Mg is (1-z), and composition ratio of $CO_3$ is (z/2)) and concretely a value generally in a range of $0.1 \leq z \leq 0.4$, preferably $0.2 \leq z \leq 0.33$; and m denotes a molar number of water in hydrotalcite and concretely an arbitrary value corresponding to the value of z).

As to the layered double hydroxide for use in the present invention, hydrotalcite represented by the following formula (III) is further preferable, because forming property is satisfactory.

$$Mg_6Al_2(OH)_{16}CO_3 \cdot 4H_2O \qquad (III)$$

When the forming material is used in manufacturing a porous ceramic structure, a pore former may be further contained in the forming material. This pore former constitutes a casting form for pores, the pores having desired shapes, sizes, and distribution are formed in the honeycomb structure, porosity is increased, and high-porosity porous honeycomb structure can be obtained. The examples of the pore former include graphite, flour, starch, phenol resin, polymathacrylic methyl, polyethylene, polyethylene terephthalate, resin balloon (acrylonitric plastic balloon) and water-absorbing resin. These materials form the pores, and burn out themselves. Above all, from a viewpoint of inhibiting the generation of $CO_2$ or harmful gas and the generation of cracks, the resin balloon is preferable. It is to be noted that when the pore former is used, the total of content ratios of the organic binder and pore former is 10 parts by mass or less, preferably 8 parts by mass or less with respect to 100 parts by mass of the forming material.

A ratio at which water is contained as a dispersing medium differs with the forming material for use, and it is difficult to uniquely determine the ratio, but the amount of water is preferably adjusted in such a manner as to achieve the above-described hardness.

A method of kneading the above-described forming material is not especially limited, and the examples include a method of using a kneader, a vacuum kneading machine or the like.

The ceramic formed article of the present invention is obtained by forming the above-described ceramic clay.

The shape of the ceramic formed article is not especially limited, and the examples include a sheet shape, tube shape, lotus root shape, honeycomb shape and the like. Above all, in the honeycomb shape, a honeycomb formed article is preferably used in which honeycomb-shaped partition walls extend through between two end faces to thereby form a plurality of cells. When the honeycomb formed article is used in filter application such as DPF, end portions of the cells are preferably alternately plugged in two end face portions. The whole shape of the ceramic formed article is not especially limited, and the examples of the shape of the honeycomb formed article include a cylindrical shape, a square pole shape, a triangular pole shape and the like. The cell shape (cell shape in a section vertical with respect to a cell forming direction) of the honeycomb formed article is not especially limited, and the examples include a quadrangular shape, a hexagonal shape, a triangular shape and the like.

A method of preparing the honeycomb formed article of the present invention is not especially limited, and forming methods which have heretofore been known are usable such as spinning lathe forming, extrusion forming, injection forming, press forming, and sheet forming. Above all, a method of extruding the ceramic clay prepared as described above using a extrusion die having a desired cell shape, partition wall thickness, and cell density may be a preferable example. A drying method is not especially limited, and drying methods which have heretofore been known are usable such as hot air drying, microwave drying, dielectric drying, reduced-pressure drying, vacuum drying, and freezing drying. Above all, a drying method obtained by combining the hot air drying and the microwave drying or the dielectric drying is preferable, because the whole forming article can be quickly and uniformly dried.

The ceramic formed article obtained as described above may be calcined (degreased) to form a calcined article. The calcining means an operation of burning and removing organic materials (binder, pore former, dispersant, etc.) in the formed article. In general, since the burning temperature of the organic binder is about 100 to 300° C., and that of the pore former is about 200 to 800° C., the calcining temperature may be set at about 200 to 1000° C. A calcining time is not especially limited, and is usually about one to ten hours. A calcining atmosphere is appropriately selected in accordance with the type of the ceramic forming material, and the examples include air atmosphere, oxygen atmosphere, nitrogen atmosphere, argon atmosphere, a suitably mixed atmosphere of these, and vacuum atmosphere.

The above-described ceramic formed article (calcined article if necessary) is fired (actually fired) to thereby obtain the ceramic structure of the present invention. The actual firing means an operation for sintering and densifying the forming material in the calcined article to secure a predetermined strength. Since firing conditions (temperature·time) differ with the type of the forming material, appropriate conditions may be selected in accordance with the type. In the present invention, for example, when the cordierite forming material is used, the ceramic formed article is preferably fired at 1300 to 1500° C. The article is further preferably fired at 1350 to 1450° C. When the temperature is less than 1300° C., a target crystal phase (e.g., cordierite) is not obtained in some cases. When the temperature exceeds 1500° C., the article is sometimes molten. When a silicon carbide forming material is used, the ceramic formed article is preferably fired at 1300 to 2500° C. The article is further preferably fired at 1350 to 2400° C. When the temperature is less than 1300° C., a target crystal phase (e.g., silicon carbide) is not obtained in some cases. When the temperature exceeds 2500° C., decomposition or sublimation is sometimes caused. Further, when the aluminum titanate forming material is used, the ceramic formed article is preferably fired at 1300 to 1800° C. The article is further preferably fired at 1400 to 1700° C. When the temperature is less than 1300° C., a target crystal phase (e.g., aluminum titanate) is not obtained in some cases. When the temperature exceeds 1800° C., the article is sometimes molten. A firing atmosphere is appropriately selected in accordance with the type of the ceramic forming material, and the examples include air atmosphere, oxygen atmosphere, nitrogen atmosphere, argon atmosphere, hydrogen atmosphere, a suitably mixed atmosphere of these, and vacuum atmosphere. In the present invention, when a cordierite forming material or an aluminum titanate forming material is used, the ceramic formed article is preferably fired in air atmosphere, oxygen atmosphere, nitrogen atmosphere, a suitably mixed atmosphere of these, or the like. When a silicon carbide forming material is used, the ceramic formed article is preferably fired in nitrogen atmosphere, argon atmosphere, a suitably mixed atmosphere of these, vacuum atmosphere, or the like.

According to the present invention, there is provided a ceramic structure obtained by the above-described method, and the structure is mainly composed (preferably 60% or more) of ceramic (e.g., cordierite) having few defects or cracks and having high strength. The examples of a preferable composition of cordierite include $2MgO \cdot 2Al_2O_3 \cdot 5SiO_2$. The examples of the preferable composition of alumina include $Al_2O_3$, an example of the preferable composition of mullite is $3Al_2O_3 \cdot 2SiO_2$, an example of the preferable composition of zirconia is $ZrO_2$, an example of the preferable composition of aluminum titanate is $Al_2TiO_5$, an example of the preferable composition of silicon nitride is $Si_3N_4$, an example of the preferable content of silicon carbide is SiC, and an example of the preferable content of aluminum nitride is AlN.

The present invention will be described further concretely hereinafter in accordance with examples, and the present invention is not limited to the examples.

It is to be noted that among forming properties (defective forming, clogging of a extrusion die, collapse) of ceramic clay obtained in the examples, defective forming was evaluated by confirming generation of a fine split on a rib or the outer wall due to bad flow of the clay, clogging of a extrusion die was evaluated by confirming presence/absence of a cut continuously generated on a formed article in a direction of extrusion, and collapse was evaluated by eye observation on cell collapse and by confirming presence/absence of a cell through which light is not transmitted due to cell collapse with irradiating light from one end face in the direction of extrusion and observing from the other end face. In addition, drying crack (discontinuous rib/cell, which should be continuous, after drying), firing crack (discontinuous rib/cell, which should be continuous, after firing), and firing melt (failure in obtaining an intended shape) were evaluated by confirming an apparent cut by eye observation on a dried article and a fired article and by confirming a cut inside the product with irradiating light from one end face in the direction of extrusion and observing from the other end face. Further, isostatic breaking strength as indexes indicating that the ceramic structure obtained in the example has the high strength and thermal expansion coefficient ($10^{-6}/°$ C.) were measured. A method of measuring the isostatic breaking strength conformed to Automobile Standard JASO-M505-87 of the Society of Automotive Engineers of Japan, A method of measuring the thermal expansion coefficient conformed to JIS R1618. The thermal expansion coefficient in the direction of extrusion was measured within the range from 40 to 800° C. Furthermore, as an index indicating that the generation of $CO_2$ or harmful gas is reduced during the firing in the ceramic structure obtained in the example, a weight decrease during the firing was measured. In a measurement method of the weight decrease during the firing, a weight ($M_1$) of the honeycomb structure before fired, and a weight ($M_2$) of the structure after fired were measured, and the weight decrease (%)= $[(M_1-M_2)/M_1] \times 100$ was calculated.

(Selection of Layered Double Hydroxide)

In Examples, layered double hydroxides (kinds: 1 to 39) shown in Table 1 were selectively used.

TABLE 1

| Kind of layered double hydroxide | Average particle diameter (μm) | Residue on sieve (%) | Amount of impurities (%) | Specific surface area (m$^2$/g) | Apparent specific gravity (g/cm$^3$) | Ratio of M$^{2+}$/M$^{3+}$ | Kind of interlayer ion | M$^{2+}$ | M$^{3+}$ |
|---|---|---|---|---|---|---|---|---|---|
| 1 | 0.1 | 0.01 | 0.3 | 20 | 0.29 | 3/1 | CO$_3^{2-}$ | Mg$^{2+}$ | Al$^{3+}$ |
| 2 | 0.5 | 0.01 | 0.3 | 18 | 0.29 | 3/1 | CO$_3^{2-}$ | Mg$^{2+}$ | Al$^{3+}$ |
| 3 | 3 | 0.01 | 0.3 | 15 | 0.29 | 3/1 | CO$_3^{2-}$ | Mg$^{2+}$ | Al$^{3+}$ |
| 4 | 8 | 0.01 | 0.3 | 14 | 0.29 | 3/1 | CO$_3^{2-}$ | Mg$^{2+}$ | Al$^{3+}$ |
| 5 | 12 | 0.01 | 0.3 | 13 | 0.29 | 3/1 | CO$_3^{2-}$ | Mg$^{2+}$ | Al$^{3+}$ |
| 6 | 25 | 0.01 | 0.3 | 12 | 0.29 | 3/1 | CO$_3^{2-}$ | Mg$^{2+}$ | Al$^{3+}$ |
| 7 | 35 | 0.01 | 0.3 | 11 | 0.29 | 3/1 | CO$_3^{2-}$ | Mg$^{2+}$ | Al$^{3+}$ |
| 8 | 3 | 0.03 | 0.3 | 15 | 0.29 | 3/1 | CO$_3^{2-}$ | Mg$^{2+}$ | Al$^{3+}$ |
| 9 | 3 | 0.07 | 0.3 | 15 | 0.29 | 3/1 | CO$_3^{2-}$ | Mg$^{2+}$ | Al$^{3+}$ |
| 10 | 3 | 0.01 | 0.8 | 15 | 0.29 | 3/1 | CO$_3^{2-}$ | Mg$^{2+}$ | Al$^{3+}$ |
| 11 | 3 | 0.01 | 1.3 | 15 | 0.29 | 3/1 | CO$_3^{2-}$ | Mg$^{2+}$ | Al$^{3+}$ |
| 12 | 3 | 0.01 | 1.8 | 15 | 0.29 | 3/1 | CO$_3^{2-}$ | Mg$^{2+}$ | Al$^{3+}$ |
| 13 | 3 | 0.01 | 2.2 | 15 | 0.29 | 3/1 | CO$_3^{2-}$ | Mg$^{2+}$ | Al$^{3+}$ |
| 14 | 3 | 0.01 | 0.3 | 0.4 | 0.29 | 3/1 | CO$_3^{2-}$ | Mg$^{2+}$ | Al$^{3+}$ |
| 15 | 3 | 0.01 | 0.3 | 0.7 | 0.29 | 3/1 | CO$_3^{2-}$ | Mg$^{2+}$ | Al$^{3+}$ |
| 16 | 3 | 0.01 | 0.3 | 3 | 0.29 | 3/1 | CO$_3^{2-}$ | Mg$^{2+}$ | Al$^{3+}$ |
| 17 | 3 | 0.01 | 0.3 | 8 | 0.29 | 3/1 | CO$_3^{2-}$ | Mg$^{2+}$ | Al$^{3+}$ |
| 18 | 3 | 0.01 | 0.3 | 27 | 0.29 | 3/1 | CO$_3^{2-}$ | Mg$^{2+}$ | Al$^{3+}$ |
| 19 | 3 | 0.01 | 0.3 | 35 | 0.29 | 3/1 | CO$_3^{2-}$ | Mg$^{2+}$ | Al$^{3+}$ |
| 20 | 3 | 0.01 | 0.3 | 55 | 0.29 | 3/1 | CO$_3^{2-}$ | Mg$^{2+}$ | Al$^{3+}$ |
| 21 | 3 | 0.01 | 0.3 | 15 | 0.04 | 3/1 | CO$_3^{2-}$ | Mg$^{2+}$ | Al$^{3+}$ |
| 22 | 3 | 0.01 | 0.3 | 15 | 0.12 | 3/1 | CO$_3^{2-}$ | Mg$^{2+}$ | Al$^{3+}$ |
| 23 | 3 | 0.01 | 0.3 | 15 | 0.25 | 3/1 | CO$_3^{2-}$ | Mg$^{2+}$ | Al$^{3+}$ |
| 24 | 3 | 0.01 | 0.3 | 15 | 0.36 | 3/1 | CO$_3^{2-}$ | Mg$^{2+}$ | Al$^{3+}$ |
| 25 | 3 | 0.01 | 0.3 | 15 | 0.42 | 3/1 | CO$_3^{2-}$ | Mg$^{2+}$ | Al$^{3+}$ |
| 26 | 3 | 0.01 | 0.3 | 15 | 0.81 | 3/1 | CO$_3^{2-}$ | Mg$^{2+}$ | Al$^{3+}$ |
| 27 | 3 | 0.01 | 0.3 | 15 | 1.06 | 3/1 | CO$_3^{2-}$ | Mg$^{2+}$ | Al$^{3+}$ |
| 28 | 3 | 0.01 | 0.4 | 15 | 0.3 | 5/1 | CO$_3^{2-}$ | Mg$^{2+}$ | Al$^{3+}$ |

TABLE 1-continued

| Kind of layered double hydroxide | Average particle diameter (μm) | Residue on sieve (%) | Amount of impurities (%) | Specific surface area (m$^2$/g) | Apparent specific gravity (g/cm$^3$) | Ratio of M$^{2+}$/M$^{3+}$ | Kind of interlayer ion | M$^{2+}$ | M$^{3+}$ |
|---|---|---|---|---|---|---|---|---|---|
| 29 | 3 | 0.01 | 0.4 | 15 | 0.29 | 4/1 | CO$_3^{2-}$ | Mg$^{2+}$ | Al$^{3+}$ |
| 30 | 3 | 0.01 | 0.3 | 15 | 0.28 | 2.25/1 | CO$_3^{2-}$ | Mg$^{2+}$ | Al$^{3+}$ |
| 31 | 3 | 0.01 | 0.5 | 15 | 0.3 | 2/1 | CO$_3^{2-}$ | Mg$^{2+}$ | Al$^{3+}$ |
| 32 | 3 | 0.01 | 0.5 | 15 | 0.3 | 1.8/1 | CO$_3^{2-}$ | Mg$^{2+}$ | Al$^{3+}$ |
| 33 | 5 | 0.01 | 0.4 | 16 | 0.27 | 3/1 | Cl$^-$ | Mg$^{2+}$ | Al$^{3+}$ |
| 34 | 6 | 0.01 | 0.5 | 15 | 0.29 | 3/1 | NO$_3^-$ | Mg$^{2+}$ | Al$^{3+}$ |
| 35 | 5 | 0.01 | 0.4 | 16 | 0.3 | 3/1 | CH$_3$COO$^-$ | Mg$^{2+}$ | Al$^{3+}$ |
| 36 | 0.1 | 0.01 | 0.8 | 12 | 0.41 | 2/1 | CO$_3^{2-}$ | Ca$^{2+}$ | Al$^{3+}$ |
| 37 | 0.2 | 0.01 | 0.9 | 8 | 0.59 | 2/1 | CO$_3^{2-}$ | Sr$^{2+}$ | Al$^{3+}$ |
| 38 | 0.1 | 0.01 | 0.8 | 9 | 0.51 | 2/1 | CO$_3^{2-}$ | Zn$^{2+}$ | Al$^{3+}$ |
| 39 | 0.1 | 0.01 | 0.7 | 10 | 0.36 | 2/1 | CO$_3^{2-}$ | Mg$^{2+}$ | Fe$^{3+}$ |

EXAMPLE 1

A forming raw material containing a ceramic forming material was kneaded to obtain a compact article of ceramic clay. Next, the compact article of ceramic clay was formed to obtain a honeycomb formed body, and then the honeycomb formed body was fired to obtain a honeycomb structure. That is, in the first place, as batch No. 1, hydrotalcite as layered double hydroxide was added to and mixed with kaolin, talc, alumina, aluminum hydroxide, and silica as ceramic (cordierite) forming materials to give a mixture. (Each amount added is shown in Table 2 by part by mass, and average particle diameter(μm) is shown in parentheses. Incidentally, some batches includes silicon carbide, silicon, and/or titanium oxide(rutile) as (an)other ceramic forming material(s) though butch No. 1 does not include any of them.) (A content ratio of hydrotalcite was set to 10% by mass with respect to a total with the cordierite forming material, and other amounts were adjusted in such a manner as to approach a ceramic composition.) To the mixture were further added methyl cellulose (10 parts by mass with respect of 100 parts by mass of the sum of the ceramic forming material and the layered double hydroxide) as a binder, potassium laurate(0.2 part by mass with respect to 100 parts by mass of the sum of the ceramic forming material and the layered double hydroxide) as a surfactant functioning as a dispersant, and water (35 parts by mass with respect to 100 parts by mass of the sum of the ceramic forming material and the layered double hydroxide) to obtain a forming material, and kneaded to thereby obtain a compact article of ceramic clay. When hardness of this clay was measured by an NGK clay hardness meter, the hardness was 12 mm. This article was formed into a honeycomb shape by an extrusion forming machine, and it was then possible to form the article without causing clogging of a extrusion die or defective forming. The obtained honeycomb formed article was dried by microwave and hot air, and fired at 1420° C. for seven hours in air atmosphere. When a crystal phase of the obtained honeycomb structure was identified by X-ray diffraction, cordierite was the main phase. The isostatic breaking strength of the honeycomb structure was 9 MPa, the thermal expansion coefficient was 0.7×10$^{-6}$/° C., and the weight decrease during firing was 9%. To put these in order, Table 3 shows the whole composition of each forming material containing the ceramic forming materials shown in Table 2, and Table 4 shows properties of each honeycomb formed article and honeycomb structure. Incidentally, the marks ⊚, ○, Δ, and x in Table 4 mean the following results with respective to each of defective forming, clogging of extrusion die, collapse, drying crack, firing crack, and firing melt.

(Defective Forming)

⊚: excellent formed condition, ○: good though a fine split was observed in a part of the outer wall, Δ: acceptable though it is not good because fine splits were observed on both a rib inside and the outer wall, and x: unacceptable with fine splits being observed on both a rib inside and the outer wall (Clogging of Extrusion Die)

⊚: no clogging of extrusion die, ○: clogging of extrusion die only in one rib, Δ: acceptable though clogging of extrusion die was caused in a plurality of ribs, and x: unacceptable with clogging of extrusion die being caused in a plurality of ribs (Collapse)

⊚: No collapse of cell during forming is caused, and the cell shape after drying is a similar figure, Δ: Collapse of cell is caused during forming, and the cell shape after drying is not a similar figure. However, no cell inhibits light from transmitting when light is irradiated from one end face in the direction of extrusion and the light is observed from the other end face, and x Collapse of cell is caused during forming, and the cell shape after drying is not a similar figure. There are some cells which inhibit light from transmitting due to collapse when light is irradiated from one end face in the direction of extrusion and the light is observed from the other end face.

(Drying Crack)

⊚: no drying crack, ○: Only a surface layer is slightly cut in a portion of less than 1 cm from the end face, and the cut portion can easily be cut down by cutting the end face after drying, Δ: The cut is 1 cm or more from the end face to inside. However, the cut portion can be cut down by cutting the end face after drying, and x: The cut is 1 cm or more from the end face to inside, and the cut portion cannot be cut down by cutting the end face after drying.

(Firing Crack)

⊚: presence of no firing crack, and x: presence of firing crack (Firing Melt)

⊚: Shrinkage in dimensions is 10% or less, and apparent shape is a similar figure of a dried article, Δ: Shrinkage in dimensions is 10% or more, and apparent shape is a similar figure of a dried article, and x Shrinkage in dimensions is 10% or more, and apparent shape is not a similar figure of a dried article

EXAMPLE 2 to 41, COMPARATIVE EXAMPLES 1 to 6

Honeycomb structures were obtained in the same manner as in Example 1 except that ceramic clay, honeycomb formed articles and honeycomb structures having properties shown in Table 4 were obtained using forming materials whose whole compositions were modified as batch numbers shown in Table 3 (For example, in the case of Example 2, the one having composition of batch No. 2 shown in Tables 2 and 3). In Examples 3 to 41 and Comparative Examples 2 to 6, layered double hydroxide was added to and mixed with ceramic (cordierite) forming material to obtain a mixture, and to the mixture was further added a resin balloon as a pore forming material (part by weight shown in Table 3 with respect to 100 parts by mass of the sum of the ceramic forming material and the layered double hydroxide)

EXAMPLES 42 to 46

Honeycomb structures were obtained in the same manner as in Example 1 except that ceramic clay, honeycomb formed articles and honeycomb structures having properties shown in Table 4 were obtained using forming materials whose whole compositions in Example 1 were modified as batch numbers shown in Table 3 (For example, in the case of Example 42, the one having composition of batch No. 42 shown in Tables 2 and 3) were calcined at 400° C. for four hours in air atmosphere, and then fired at 1450° C. for two hours in argon atmosphere. In Examples 42 to 46, layered double hydroxide was added to and mixed with ceramic (silicon carbide is the main component) forming material to obtain a mixture, and to the mixture was further added a resin balloon as a pore forming material (part by weight shown in Table 3 with respect to 100 parts by mass of the sum of the ceramic forming material and the layered double hydroxide).

EXAMPLE 47 to 51

Honeycomb structures were obtained in the same manner as in Example 1 except that ceramic clay, honeycomb formed articles and honeycomb structures having properties shown in Table 4 were obtained using forming materials whose whole compositions in Example 1 were modified as batch numbers shown in Table 3 (For example, in the case of Example 47, the one having composition of batch No. 47 shown in Tables 2 and 3) were fired at 1500° C. for four hours in air atmosphere. In Examples 47 to 51, layered double hydroxide was added to and mixed with ceramic (aluminum titanate is the main component) forming material to obtain a mixture, and to the mixture was further added a resin balloon as a pore forming material (part by weight shown in Table 3 with respect to 100 parts by mass of the sum of the ceramic forming material and the layered double hydroxide).

TABLE 2

| | Ceramic forming materials | | | | | | | |
|---|---|---|---|---|---|---|---|---|
| Batch No. | talc | kaolin | alumina | aluminum hydroxide | silica | silicon carbide | silicon | titanium oxide (rutile) |
| 1 | 25(25 μm) | 20(5 μm) | 12.5(5 μm) | 12.5(5 μm) | 20(30 μm) | 0 | 0 | 0 |
| 2 | 25(25 μm) | 20(5 μm) | 12.5(5 μm) | 12.5(5 μm) | 20(30 μm) | 0 | 0 | 0 |
| 3 | 32(25 μm) | 20(5 μm) | 14(5 μm) | 14(5 μm) | 15(30 μm) | 0 | 0 | 0 |
| 4 | 32(25 μm) | 20(5 μm) | 14(5 μm) | 14(5 μm) | 15(30 μm) | 0 | 0 | 0 |
| 5 | 32(25 μm) | 20(5 μm) | 14(5 μm) | 14(5 μm) | 15(30 μm) | 0 | 0 | 0 |
| 6 | 32(25 μm) | 20(5 μm) | 14(5 μm) | 14(5 μm) | 15(30 μm) | 0 | 0 | 0 |
| 7 | 32(25 μm) | 20(5 μm) | 14(5 μm) | 14(5 μm) | 15(30 μm) | 0 | 0 | 0 |
| 8 | 32(25 μm) | 20(5 μm) | 14(5 μm) | 14(5 μm) | 15(30 μm) | 0 | 0 | 0 |
| 9 | 32(25 μm) | 20(5 μm) | 14(5 μm) | 14(5 μm) | 15(30 μm) | 0 | 0 | 0 |
| 10 | 32(25 μm) | 20(5 μm) | 14(5 μm) | 14(5 μm) | 15(30 μm) | 0 | 0 | 0 |
| 11 | 32(25 μm) | 20(5 μm) | 14(5 μm) | 14(5 μm) | 15(30 μm) | 0 | 0 | 0 |
| 12 | 32(25 μm) | 20(5 μm) | 14(5 μm) | 14(5 μm) | 15(30 μm) | 0 | 0 | 0 |
| 13 | 32(25 μm) | 20(5 μm) | 14(5 μm) | 14(5 μm) | 15(30 μm) | 0 | 0 | 0 |
| 14 | 32(25 μm) | 20(5 μm) | 14(5 μm) | 14(5 μm) | 15(30 μm) | 0 | 0 | 0 |
| 15 | 32(25 μm) | 20(5 μm) | 14(5 μm) | 14(5 μm) | 15(30 μm) | 0 | 0 | 0 |
| 16 | 32(25 μm) | 20(5 μm) | 14(5 μm) | 14(5 μm) | 15(30 μm) | 0 | 0 | 0 |
| 17 | 32(25 μm) | 20(5 μm) | 14(5 μm) | 14(5 μm) | 15(30 μm) | 0 | 0 | 0 |
| 18 | 32(25 μm) | 20(5 μm) | 14(5 μm) | 14(5 μm) | 15(30 μm) | 0 | 0 | 0 |
| 19 | 32(25 μm) | 20(5 μm) | 14(5 μm) | 14(5 μm) | 15(30 μm) | 0 | 0 | 0 |
| 20 | 32(25 μm) | 20(5 μm) | 14(5 μm) | 14(5 μm) | 15(30 μm) | 0 | 0 | 0 |
| 21 | 32(25 μm) | 20(5 μm) | 14(5 μm) | 14(5 μm) | 15(30 μm) | 0 | 0 | 0 |
| 22 | 32(25 μm) | 20(5 μm) | 14(5 μm) | 14(5 μm) | 15(30 μm) | 0 | 0 | 0 |
| 23 | 32(25 μm) | 20(5 μm) | 14(5 μm) | 14(5 μm) | 15(30 μm) | 0 | 0 | 0 |
| 24 | 32(25 μm) | 20(5 μm) | 14(5 μm) | 14(5 μm) | 15(30 μm) | 0 | 0 | 0 |
| 25 | 32(25 μm) | 20(5 μm) | 14(5 μm) | 14(5 μm) | 15(30 μm) | 0 | 0 | 0 |
| 26 | 32(25 μm) | 20(5 μm) | 14(5 μm) | 14(5 μm) | 15(30 μm) | 0 | 0 | 0 |
| 27 | 32(25 μm) | 20(5 μm) | 14(5 μm) | 14(5 μm) | 15(30 μm) | 0 | 0 | 0 |
| 28 | 32(25 μm) | 20(5 μm) | 14(5 μm) | 14(5 μm) | 15(30 μm) | 0 | 0 | 0 |
| 29 | 32(25 μm) | 20(5 μm) | 14(5 μm) | 14(5 μm) | 15(30 μm) | 0 | 0 | 0 |
| 30 | 32(25 μm) | 20(5 μm) | 14(5 μm) | 14(5 μm) | 15(30 μm) | 0 | 0 | 0 |
| 31 | 32(25 μm) | 20(5 μm) | 14(5 μm) | 14(5 μm) | 15(30 μm) | 0 | 0 | 0 |
| 32 | 32(25 μm) | 20(5 μm) | 14(5 μm) | 14(5 μm) | 15(30 μm) | 0 | 0 | 0 |
| 33 | 32(25 μm) | 20(5 μm) | 14(5 μm) | 14(5 μm) | 15(30 μm) | 0 | 0 | 0 |
| 34 | 32(25 μm) | 20(5 μm) | 14(5 μm) | 14(5 μm) | 15(30 μm) | 0 | 0 | 0 |
| 35 | 32(25 μm) | 20(5 μm) | 14(5 μm) | 14(5 μm) | 15(30 μm) | 0 | 0 | 0 |
| 36 | 32(25 μm) | 20(5 μm) | 14(5 μm) | 14(5 μm) | 15(30 μm) | 0 | 0 | 0 |
| 37 | 38.4(25 μm) | 20(5 μm) | 14.8(5 μm) | 14(5 μm) | 15(30 μm) | 0 | 0 | 0 |
| 38 | 4(25 μm) | 16(5 μm) | 9(5 μm) | 9(5 μm) | 32(30 μm) | 0 | 0 | 0 |

TABLE 2-continued

| Batch No. | Ceramic forming materials | | | | | | | |
|---|---|---|---|---|---|---|---|---|
| | talc | kaolin | alumina | aluminum hydroxide | silica | silicon carbide | silicon | titanium oxide (rutile) |
| 39 | 32(25 μm) | 20(5 μm) | 14(5 μm) | 14(5 μm) | 15(30 μm) | 0 | 0 | 0 |
| 40 | 32(25 μm) | 20(5 μm) | 14(5 μm) | 14(5 μm) | 15(30 μm) | 0 | 0 | 0 |
| 41 | 32(25 μm) | 20(5 μm) | 14(5 μm) | 14(5 μm) | 15(30 μm) | 0 | 0 | 0 |
| 42 | 0 | 0 | 0 | 0 | 0 | 76(33 μm) | 19(5 μm) | 0 |
| 43 | 0 | 0 | 0 | 0 | 0 | 76(33 μm) | 19(5 μm) | 0 |
| 44 | 0 | 0 | 0 | 0 | 0 | 76(33 μm) | 19(5 μm) | 0 |
| 45 | 0 | 0 | 0 | 0 | 0 | 76(33 μm) | 19(5 μm) | 0 |
| 46 | 0 | 0 | 0 | 0 | 0 | 76(33 μm) | 19(5 μm) | 0 |
| 47 | 0 | 8(3 μm) | 47(2 μm) | 0 | 0 | 0 | 0 | 40(0.2 μm) |
| 48 | 0 | 8(3 μm) | 47(2 μm) | 0 | 0 | 0 | 0 | 40(0.2 μm) |
| 49 | 0 | 8(3 μm) | 47(2 μm) | 0 | 0 | 0 | 0 | 40(0.2 μm) |
| 50 | 0 | 8(3 μm) | 47(2 μm) | 0 | 0 | 0 | 0 | 40(0.2 μm) |
| 51 | 0 | 8(3 μm) | 47(2 μm) | 0 | 0 | 0 | 0 | 40(0.2 μm) |
| 52 | 40(25 μm) | 20(5 μm) | 15(5 μm) | 15(5 μm) | 10(30 μm) | 0 | 0 | 0 |
| 53 | 40(25 μm) | 20(5 μm) | 15(5 μm) | 15(5 μm) | 10(30 μm) | 0 | 0 | 0 |
| 54 | 39.8(25 μm) | 20(5 μm) | 15(5 μm) | 15(5 μm) | 10.1(30 μm) | 0 | 0 | 0 |
| 55 | 0 | 10(5 μm) | 5(5 μm) | 5(5 μm) | 20(30 μm) | 0 | 0 | 0 |
| 56 | 32(25 μm) | 20(5 μm) | 14(5 μm) | 14(5 μm) | 15(30 μm) | 0 | 0 | 0 |
| 57 | 32(25 μm) | 20(5 μm) | 14(5 μm) | 14(5 μm) | 15(30 μm) | 0 | 0 | 0 |

TABLE 3

| Batch No. | Ceramic forming material | kind of Layered double hydroxide | Amount of addition | Foaming resin | Binder | Surfactant | Water |
|---|---|---|---|---|---|---|---|
| 1 | 90 | 3 | 10 | 0 | 0 | 0.2 | 35 |
| 2 | 90 | 3 | 10 | 0 | 4 | 0.2 | 36 |
| 3 | 95 | 1 | 5 | 1 | 3 | 0.2 | 28 |
| 4 | 95 | 2 | 5 | 1 | 3 | 0.2 | 28 |
| 5 | 95 | 3 | 5 | 1 | 3 | 0.2 | 28 |
| 6 | 95 | 4 | 5 | 1 | 3 | 0.2 | 28 |
| 7 | 95 | 10 | 5 | 1 | 3 | 0.2 | 28 |
| 8 | 95 | 17 | 5 | 1 | 3 | 0.2 | 28 |
| 9 | 95 | 18 | 5 | 1 | 3 | 0.2 | 30 |
| 10 | 95 | 23 | 5 | 1 | 3 | 0.2 | 28 |
| 11 | 95 | 24 | 5 | 1 | 3 | 0.2 | 28 |
| 12 | 95 | 5 | 5 | 1 | 3 | 0.2 | 28 |
| 13 | 95 | 6 | 5 | 1 | 3 | 0.2 | 28 |
| 14 | 95 | 7 | 5 | 1 | 3 | 0.2 | 28 |
| 15 | 95 | 8 | 5 | 1 | 3 | 0.2 | 28 |
| 16 | 95 | 9 | 5 | 1 | 3 | 0.2 | 28 |
| 17 | 95 | 11 | 5 | 1 | 3 | 0.2 | 28 |
| 18 | 95 | 12 | 5 | 1 | 3 | 0.2 | 28 |
| 19 | 95 | 13 | 5 | 1 | 3 | 0.2 | 28 |
| 20 | 95 | 14 | 5 | 1 | 3 | 0.2 | 28 |
| 21 | 95 | 15 | 5 | 1 | 3 | 0.2 | 28 |
| 22 | 95 | 16 | 5 | 1 | 3 | 0.2 | 28 |
| 23 | 95 | 19 | 5 | 1 | 3 | 0.2 | 33 |
| 24 | 95 | 20 | 5 | 1 | 3 | 0.2 | 36 |
| 25 | 95 | 21 | 5 | 1 | 3 | 0.2 | 28 |
| 26 | 95 | 22 | 5 | 1 | 3 | 0.2 | 28 |
| 27 | 95 | 25 | 5 | 1 | 3 | 0.2 | 28 |
| 28 | 95 | 26 | 5 | 1 | 3 | 0.2 | 28 |
| 29 | 95 | 27 | 5 | 1 | 3 | 0.2 | 28 |
| 30 | 95 | 28 | 5 | 1 | 3 | 0.2 | 28 |
| 31 | 95 | 29 | 5 | 1 | 3 | 0.2 | 28 |
| 32 | 95 | 30 | 5 | 1 | 3 | 0.2 | 28 |
| 33 | 95 | 31 | 5 | 1 | 3 | 0.2 | 28 |
| 34 | 95 | 32 | 5 | 1 | 3 | 0.2 | 28 |
| 35 | 95 | 3 | 5 | 1 | 3 | 0.2 | 38 |
| 36 | 95 | 3 | 5 | 1 | 3 | 0.2 | 20 |
| 37 | 99 | 3 | 1 | 1 | 3 | 0.2 | 28 |
| 38 | 60 | 3 | 30 | 1 | 3 | 0.2 | 28 |
| 39 | 95 | 33 | 5 | 1 | 3 | 0.2 | 28 |
| 40 | 95 | 34 | 5 | 1 | 3 | 0.2 | 28 |
| 41 | 95 | 35 | 5 | 1 | 3 | 0.2 | 28 |
| 42 | 95 | 3 | 5 | 1 | 3 | 0.2 | 27 |
| 43 | 95 | 36 | 5 | 1 | 3 | 0.2 | 27 |
| 44 | 95 | 37 | 5 | 1 | 3 | 0.2 | 27 |

TABLE 3-continued

| Batch No. | Ceramic forming material | kind of Layered double hydroxide | Amount of addition | Foaming resin | Binder | Surfactant | Water |
|---|---|---|---|---|---|---|---|
| 45 | 95 | 38 | 5 | 1 | 3 | 0.2 | 27 |
| 46 | 95 | 39 | 5 | 1 | 3 | 0.2 | 27 |
| 47 | 95 | 3 | 5 | 1 | 3 | 0.2 | 25 |
| 48 | 95 | 36 | 5 | 1 | 3 | 0.2 | 25 |
| 49 | 95 | 37 | 5 | 1 | 3 | 0.2 | 25 |
| 50 | 95 | 38 | 5 | 1 | 3 | 0.2 | 25 |
| 51 | 95 | 39 | 5 | 1 | 3 | 0.2 | 25 |
| 52 | 100 | — | 0 | 0 | 8 | 0.2 | 33 |
| 53 | 100 | — | 0 | 1 | 8 | 0.2 | 34 |
| 54 | 99.9 | 3 | 0.1 | 1 | 3 | 0.2 | 28 |
| 55 | 40 | 3 | 60 | 1 | 3 | 0.2 | 28 |
| 56 | 95 | 3 | 5 | 1 | 3 | 0.2 | 42 |
| 57 | 95 | 3 | 5 | 1 | 3 | 0.2 | 14 |

TABLE 4

| | Batch No. | Hardness (mm) NGK clay hardness meter | Forming property | | | | | | Thermal expansion coefficient | Isostatic breaking strength | Weight decrease |
|---|---|---|---|---|---|---|---|---|---|---|---|
| | | | Defective forming | Clogging of extrusion die | Collapse | Drying cut | Firing cut | Firing melt | | | |
| Example 1 | 1 | 12 | ◎ | ◎ | ◎ | ◎ | ◎ | ◎ | 0.7 | 9 | 9 |
| Example 2 | 2 | 12 | ◎ | ◎ | ◎ | ◎ | ◎ | ◎ | 0.7 | 6 | 12 |
| Example 3 | 3 | 12 | ◎ | ◎ | ◎ | ◎ | ◎ | ◎ | 0.4 | 9 | 11 |
| Example 4 | 4 | 12 | ◎ | ◎ | ◎ | ◎ | ◎ | ◎ | 0.4 | 9 | 11 |
| Example 5 | 5 | 12 | ◎ | ◎ | ◎ | ◎ | ◎ | ◎ | 0.5 | 7 | 10 |
| Example 6 | 6 | 11 | ◎ | ◎ | ◎ | ◎ | ◎ | ◎ | 0.6 | 6 | 10 |
| Example 7 | 7 | 12 | ◎ | ◎ | ◎ | ◎ | ◎ | ◎ | 0.9 | 8 | 10 |
| Example 8 | 8 | 11 | ◎ | ◎ | ◎ | ◎ | ◎ | ◎ | 0.6 | 6 | 10 |
| Example 9 | 9 | 11 | ◎ | ◎ | ◎ | ◎ | ◎ | ◎ | 0.4 | 7 | 10 |
| Example 10 | 10 | 11 | ◎ | ◎ | ◎ | ◎ | ◎ | ◎ | 0.5 | 6 | 10 |
| Example 11 | 11 | 11 | ◎ | ◎ | ◎ | ◎ | ◎ | ◎ | 0.5 | 6 | 10 |
| Example 12 | 12 | 11 | ○ | ◎ | ◎ | ◎ | ◎ | ◎ | 0.6 | 6 | 9 |
| Example 13 | 13 | 11 | ○ | ◎ | ◎ | ◎ | ◎ | ◎ | 0.7 | 6 | 9 |
| Example 14 | 14 | 11 | △ | ◎ | ◎ | ◎ | ◎ | ◎ | 0.8 | 5 | 9 |
| Example 15 | 15 | 12 | ◎ | ○ | ◎ | ◎ | ◎ | ◎ | 0.5 | 6 | 10 |
| Example 16 | 16 | 12 | ○ | △ | ◎ | ◎ | ◎ | ◎ | 0.6 | 5 | 10 |
| Example 17 | 17 | 12 | ◎ | ◎ | ◎ | ◎ | ◎ | ◎ | 1 | 9 | 10 |
| Example 18 | 18 | 12 | ◎ | ◎ | ◎ | ◎ | ◎ | ◎ | 1.1 | 9 | 10 |
| Example 19 | 19 | 12 | ◎ | ◎ | ◎ | ◎ | ◎ | ◎ | 1.3 | 10 | 10 |
| Example 20 | 20 | 10 | △ | ◎ | ◎ | ◎ | ◎ | ◎ | 0.7 | 5 | 10 |
| Example 21 | 21 | 11 | ○ | ◎ | ◎ | ◎ | ◎ | ◎ | 0.6 | 6 | 10 |
| Example 22 | 22 | 12 | ○ | ◎ | ◎ | ◎ | ◎ | ◎ | 0.8 | 6 | 10 |
| Example 23 | 23 | 12 | ◎ | ◎ | ◎ | ◎ | ◎ | ◎ | 0.3 | 6 | 10 |
| Example 24 | 24 | 12 | ◎ | ◎ | ◎ | ◎ | ◎ | ◎ | 0.3 | 6 | 10 |
| Example 25 | 25 | 11 | △ | ◎ | ◎ | ◎ | ◎ | ◎ | 0.5 | 5 | 10 |
| Example 26 | 26 | 11 | ○ | ◎ | ◎ | ○ | ◎ | ◎ | 0.5 | 5 | 10 |
| Example 27 | 27 | 11 | ○ | ◎ | ◎ | ◎ | ◎ | ◎ | 0.5 | 6 | 10 |
| Example 28 | 28 | 11 | ○ | ◎ | ◎ | ◎ | ◎ | ◎ | 0.5 | 6 | 10 |
| Example 29 | 29 | 11 | △ | ◎ | ◎ | ◎ | ◎ | ◎ | 0.5 | 6 | 10 |
| Example 30 | 30 | 12 | △ | ◎ | ◎ | ◎ | ◎ | ◎ | 0.5 | 7 | 10 |
| Example 31 | 31 | 12 | ○ | ◎ | ◎ | ◎ | ◎ | ◎ | 0.5 | 7 | 10 |
| Example 32 | 32 | 12 | ○ | ◎ | ◎ | ◎ | ◎ | ◎ | 0.5 | 7 | 10 |
| Example 33 | 33 | 12 | ○ | ◎ | ◎ | ◎ | ◎ | ◎ | 0.5 | 7 | 10 |
| Example 34 | 34 | 12 | △ | ◎ | ◎ | ◎ | ◎ | ◎ | 0.5 | 7 | 10 |
| Example 35 | 35 | 5 | ◎ | ◎ | △ | ◎ | ◎ | ◎ | 0.5 | 6 | 10 |
| Example 36 | 36 | 17 | △ | △ | ◎ | ◎ | ◎ | ◎ | 0.5 | 6 | 10 |
| Example 37 | 37 | 12 | △ | △ | ◎ | ◎ | ◎ | ◎ | 0.3 | 5 | 9 |
| Example 38 | 38 | 12 | ◎ | ◎ | ◎ | ◎ | ◎ | △ | 0.8 | 7 | 13 |
| Example 39 | 39 | 12 | ◎ | ◎ | ◎ | ◎ | ◎ | ◎ | 0.6 | 6 | 10 |
| Example 40 | 40 | 12 | ◎ | ◎ | ◎ | ◎ | ◎ | ◎ | 0.7 | 6 | 11 |
| Example 41 | 41 | 12 | ◎ | ◎ | ◎ | ◎ | ◎ | ◎ | 0.7 | 6 | 11 |
| Example 42 | 42 | 12 | ◎ | ◎ | ◎ | ◎ | ◎ | ◎ | 4.4 | 10 | 8 |
| Example 43 | 43 | 12 | ◎ | ◎ | ◎ | ◎ | ◎ | ◎ | 4.5 | 11 | 8 |
| Example 44 | 44 | 12 | ◎ | ◎ | ◎ | ◎ | ◎ | ◎ | 4.4 | 11 | 8 |
| Example 45 | 45 | 12 | ◎ | ◎ | ◎ | ◎ | ◎ | ◎ | 4.4 | 11 | 9 |
| Example 46 | 46 | 12 | ◎ | ◎ | ◎ | ◎ | ◎ | ◎ | 4.5 | 10 | 8 |
| Example 47 | 47 | 12 | ◎ | ◎ | ◎ | ◎ | ◎ | ◎ | 1.8 | 2 | 10 |
| Example 48 | 48 | 12 | ◎ | ◎ | ◎ | ◎ | ◎ | ◎ | 1.7 | 2 | 11 |
| Example 49 | 49 | 12 | ◎ | ◎ | ◎ | ◎ | ◎ | ◎ | 1.8 | 2 | 10 |

TABLE 4-continued

| | Batch No. | Hardness (mm) NGK clay hardness meter | Defective forming | Clogging of extrusion die | Collapse | Drying cut | Firing cut | Firing melt | Thermal expansion coefficient | Isostatic breaking strength | Weight decrease |
|---|---|---|---|---|---|---|---|---|---|---|---|
| Example 50 | 50 | 12 | ◎ | ◎ | ◎ | ◎ | ◎ | ◎ | 1.8 | 2 | 10 |
| Example 51 | 51 | 12 | ◎ | ◎ | ◎ | ◎ | ◎ | ◎ | 1.9 | 1 | 10 |
| Comp. Ex. 1 | 52 | 12 | ○ | ○ | ◎ | ○ | X | ◎ | 0.4 | 5 | 13 |
| Comp. Ex. 2 | 53 | 12 | ○ | ○ | ◎ | ○ | X | ◎ | 0.4 | 4 | 14 |
| Comp. Ex. 3 | 54 | 12 | X | X | | No article could be obtained for drying and later step. | | | | | |
| Comp. Ex. 4 | 55 | 12 | ◎ | ◎ | ◎ | ◎ | ◎ | X | 8 | 7 | 15 |
| Comp. Ex. 5 | 56 | 3 | ◎ | ◎ | X | No article could be obtained for drying and later step. | | | | | |
| Comp. Ex. 6 | 57 | 19 | X | X | | No article could be obtained for drying and later step. | | | | | |

The present invention is preferably used in various apparatuses, devices, and members which are effective as measures for preventing pollution and global warming in various fields such as chemistry, electric power, iron and steel, and industrial waste disposal.

What is claimed is:

1. A ceramic-forming green clay obtained by kneading a mixture comprising:
   a ceramic-forming material selected from the group consisting of silicon carbide, aluminum titanate, and cordierite; and
   a layered double hydroxide shown by formula (I):

$$[M^{2+}_{1-x}M^{3+}_x(OH)_2][A^{n-}_{x/n} \cdot yH_2O] \tag{I}$$

wherein $M^{2+}$, $M^{3+}$, and $A^{n-}$ denote a bivalent cation, tervalent cation, and an anion, respectively, n denotes anion valence ($1 \leq n \leq 3$), x denotes a composition ratio of tervalent cation ($M^{3+}$) with respect to the sum of bivalent cation ($M^{2+}$) and tervalent cation ($M^{3+}$) and a value in a range of $0.1 \leq x \leq 0.4$ and y denotes a molar number of water in the layered double hydroxide;
   wherein a ratio of a mass of the layered double hydroxide with respect to a total mass of the ceramic-forming material and the layered double hydroxide is 0.5 to 10%; and
   wherein the clay has a hardness, measured by an NGK clay hardness meter, in a range of 4 to 18 mm.

2. The ceramic-forming green clay according to claim 1, wherein the layered double hydroxide is a hydrotalcite represented by formula (II):

$$Mg_{1-z}Al_z(OH)_2(CO_3)_{z/2} \cdot mH_2O \tag{II},$$

wherein $CO_3$ has a valence of (−2), z denotes a composition ratio of Al with respect to the sum of Mg and Al and a value in a range of $0.1 \leq z \leq 0.4$, and m denotes a molar number of water in hydrotalcite.

3. The ceramic-forming green clay according to claim 1, wherein the layered double hydroxide is a hydrotalcite represented by formula (III):

$$Mg_6Al_2(OH)_{16}CO_3 \cdot 4H_2O \tag{III}.$$

4. An article formed of the ceramic-forming green clay according to claim 1.

5. An article according to claim 4, in a honeycomb shape.

6. A method of manufacturing a ceramic forming green clay, comprising the steps of:
   kneading a forming material containing a ceramic-forming material and a layered double hydroxide to obtain a ceramic forming green clay;
   wherein the ceramic-forming material is selected from the group consisting of silicon carbide, aluminum titanate and cordierite; and
   wherein the layered double hydroxide is shown by the following formula (I):

$$[M^{2+}_{1-x}M^{3+}_x(OH)_2][A^{n-}_{x/n} \cdot yH_2O] \tag{I}$$

wherein $M^{2+}$, $M^{3+}$, and $A^{n-}$ denote a bivalent cation, tervalent cation, and an anion, respectively, n denotes anion valence ($1 \leq n \leq 3$), x denotes a composition ratio of tervalent cation ($M^{3+}$) with respect to the sum of bivalent cation ($M^{2+}$) and tervalent cation ($M^{3+}$) and a value in a range of $0.1 \leq x \leq 0.4$, and y denotes a molar number of water in the layered double hydroxide;
   wherein a ratio of a mass of the layered double hydroxide with respect to a total mass of the ceramic-forming material and the layered double hydroxide is 0.5 to 10%; and
   wherein a hardness of the ceramic clay, measured by an NGK clay hardness meter, is in a range of 4 to 18 mm.

7. The method of manufacturing the ceramic forming green clay according to claim 6, wherein a hydrotalcite represented by the following formula (II) is used as the layered double hydroxide:

$$Mg_{1-z}Al_z(OH)_2(CO_3)_{z/2} \cdot mH_2O \tag{II},$$

wherein $CO_3$ has an average valence of (−2), z denotes a composition ratio of Al with respect to the sum of Mg and Al and a value in a range of $0.1 \leq z \leq 0.4$, and m denotes a molar number of water in hydrotalcite.

8. The method of manufacturing the ceramic forming green clay according to claim 6, wherein a hydrotalcite represented by the following formula (III) is used as the layered double hydroxide:

$$Mg_6Al_2(OH)_{16}CO_3 \cdot 4H_2O \tag{III}.$$

9. A method of manufacturing a formed ceramic article, comprising the steps of: further forming the ceramic forming green clay obtained by the method according to claim 6 to obtain a formed ceramic article.

10. The method of manufacturing the formed ceramic article according to claim 9, further comprising the steps of: forming the ceramic forming green clay into a honeycomb shape to obtain a honeycomb formed ceramic article.

11. A method of manufacturing a ceramic structure, comprising the steps of: further firing the formed ceramic article obtained by the method according to claim 9 to obtain a ceramic structure.

12. The ceramic-forming green clay according to claim 1, wherein the ceramic-forming material is cordierite.

13. The ceramic-forming green clay according to claim 2, wherein the ceramic-forming material is cordierite.

14. The ceramic-forming green clay according to claim 3, wherein the ceramic-forming material is cordierite.

15. The article according to claim 4, wherein the ceramic-forming material is cordierite.

16. The article according to claim 5, wherein the ceramic-forming material is cordierite.

17. A cordierite ceramic structure comprising an article according to claim 15, after firing at 1300-1500° C.

18. A cordierite ceramic structure comprising an article according to claim 16, after firing at 1300-1500° C.

19. The ceramic-forming green clay according to claim 1, wherein the ceramic-forming material has particle diameters in a range of 0.5 to 100 μm.

20. A ceramic structure comprising the article according to claim 4 after firing at 1300-2500° C.

* * * * *